(12) United States Patent
Heyl

(10) Patent No.: US 12,128,739 B2
(45) Date of Patent: Oct. 29, 2024

(54) THERMAL MANAGEMENT ARRANGEMENT FOR VEHICLES AND METHOD FOR OPERATING A THERMAL MANAGEMENT ARRANGEMENT

(71) Applicant: Hanon Systems, Daejeon (KR)

(72) Inventor: Peter Heyl, Cologne (DE)

(73) Assignee: HANON SYSTEMS, Daejeon (KR)

( * ) Notice: Subject to any disclaimer, the term of this patent is extended or adjusted under 35 U.S.C. 154(b) by 171 days.

(21) Appl. No.: 17/905,547

(22) PCT Filed: May 27, 2021

(86) PCT No.: PCT/KR2021/006574
§ 371 (c)(1),
(2) Date: Sep. 2, 2022

(87) PCT Pub. No.: WO2021/242017
PCT Pub. Date: Dec. 2, 2021

(65) Prior Publication Data
US 2023/0173891 A1    Jun. 8, 2023

(30) Foreign Application Priority Data

May 28, 2020 (DE) ..................... 10 2020 114 357.5
May 20, 2021 (DE) ..................... 10 2021 113 104.9

(51) Int. Cl.
*B60H 1/32*         (2006.01)
*B60H 1/00*         (2006.01)

(52) U.S. Cl.
CPC ..... *B60H 1/32284* (2019.05); *B60H 1/00278* (2013.01); *B60H 2001/00307* (2013.01)

(58) Field of Classification Search
CPC .......... H60H 1/32284; H60H 1/00278; B60H 2001/00307; F01P 2060/08
See application file for complete search history.

(56) References Cited

U.S. PATENT DOCUMENTS

2015/0258875 A1    9/2015  Enomoto et al.
2017/0373359 A1   12/2017  Krull et al.
(Continued)

FOREIGN PATENT DOCUMENTS

| CN | 106314070 A * | 1/2017 | ......... B60H 1/00057 |
| DE | 102018121390 A1 | 3/2020 | |

(Continued)

*Primary Examiner* — Emmanuel E Duke
(74) *Attorney, Agent, or Firm* — Shumaker, Loop & Kendrick, LLP; James D. Miller

(57) ABSTRACT

A thermal management arrangement for vehicles, having a refrigerant circuit with at least one refrigerant compressor, a condenser/gas cooler, an expansion element and an evaporator, a cold carrier circuit with a cold carrier distributor reservoir and a heat carrier circuit with a heat carrier distributor reservoir, wherein the refrigerant circuit is thermally connected to the cold carrier circuit via the evaporator and to the heat carrier circuit via the condenser/gas cooler, and wherein a battery heat exchanger supply section is arranged and embodied with a battery heat exchanger and an environmental heat exchanger supply section is arranged and embodied with an environmental heat exchanger such that they are respectively fluidly connected to the cold carrier distributor reservoir and to the heat carrier distributor reservoir.

15 Claims, 2 Drawing Sheets

(56) References Cited

U.S. PATENT DOCUMENTS

| | | |
|---|---|---|
| 2018/0264913 A1 | 9/2018 | Enomoto et al. |
| 2019/0070924 A1 | 3/2019 | Mancini et al. |
| 2019/0078497 A1 | 3/2019 | Enomoto et al. |
| 2020/0130456 A1 | 4/2020 | Kim et al. |

FOREIGN PATENT DOCUMENTS

| | | | |
|---|---|---|---|
| ES | 2299673 T3 * | 6/2008 | ......... B60H 1/00392 |
| JP | H11286211 A | 10/1999 | |
| JP | 6534924 B2 | 6/2019 | |
| WO | 2020050517 A1 | 3/2020 | |

* cited by examiner

THERMAL MANAGEMENT ARRANGEMENT FOR VEHICLES AND METHOD FOR OPERATING A THERMAL MANAGEMENT ARRANGEMENT

CROSS REFERENCE TO RELATED APPLICATIONS

This is a U.S. national phase patent application of PCT/KR2021/006574 filed May 27, 2021 which claims the benefit of and priority to German Pat. Appl. No. 10 2021 113 104.9 filed on May 20, 2021 and German Pat. Appl. No. 10 2020 114 357.5 filed on May 28, 2020, the entire contents of each of which are incorporated herein by reference.

TECHNICAL FIELD

The invention relates to a thermal management arrangement and a method for operating a thermal management arrangement.

BACKGROUND ART

A thermal management arrangement in the sense of the invention is understood to be a device of several components and its control and regulating means which realizes the supply of a vehicle with heat and/or cold. In doing so, exhaust heat is optionally released to the environment or in the case of a heat deficit, environmental heat or exhaust heat of components of the vehicle of the thermal management arrangement is accepted or used in order to provide this heat at a corresponding temperature level in the vehicle for heating the vehicle cabin or components.

The field of application of the corresponding thermal management arrangement is in particular for vehicles with highly efficient internal combustion engines and for hybrid or electric vehicles. Battery-electric operated vehicles are a preferred field of application of the thermal management arrangement as the advantages become especially apparent there.

In the state of the art, sometimes several coolant circuits or refrigerant circuits which release their exhaust heat to the environment via several different heat exchangers in the front end of a vehicle are installed in vehicles. This leads to heat exchangers packs with large volumes, wherein there are often difficulties to solve the heat exchanger tasks in a fluidically satisfying manner, as the heat exchangers share the limited fluidically advantageous area or less favorable conditions have to be consciously accepted.

Furthermore, in modern vehicles with efficient internal combustion engines or hybrid and electric vehicles, there is the problem that not enough heat at a required temperature level in the engines is created such that every available exhaust heat is used with the help of a heat pump, for example, in order to realize a sufficient heating of the vehicle interior or the heating of further components.

In particular in the case of battery-electric operated vehicles, there is the requirement to integrate the thermal management of the battery into the thermal management of the vehicle.

From US 2019/0070924 A1, a thermal management arrangement for a vehicle is known, which has a vehicle heat pump, a battery cooling system, a drive train cooling and an electronic control, which realizes the heating and cooling of the components.

US 2017/0373359 A1 discloses an integrated coolant bottle assembly which has a reservoir for coolant.

US 2020/0130456 A1 discloses a cooling module for vehicles with several coolant tanks for a high and low temperature heat exchanger.

A further thermal management arrangement according to the state of the art is suggested in JP 19990286211 A2, for example.

Finally, DE 10 2018 121 390 A1 discloses a thermal management arrangement for vehicles which has at least one heat carrier reservoir.

SUMMARY

A disadvantage of the systems of the state of the art is that different technical solutions are used in parallel, which leads to a high installation space requirement of the overall systems and through negative mutual influence of the solutions, no desirable high efficiency can be reached.

Furthermore, there are efforts in the professional field to reduce the refrigerant filling volumes of the refrigerant circuits, which is desirable for economic, ecologic and safety-related reasons and such that refrigerants with safety-related higher requirements with lower filling volumes can be used.

The aim of the invention is to provide a thermal management arrangement and a method for operating such a thermal management arrangement for vehicles which requires a smaller installation space inside the vehicle, is designed in a simple manner and which uses a simple refrigerant circuit with its main components and with a refrigerant which is natural, if possible, such as carbon dioxide, propane, propylene, isobutane, ammonia, but can also be operated with the chemical refrigerants, such as R1234yf or R134a or refrigerant mixtures.

Furthermore, an efficient thermal management concept should be made possible, through which, as a result, sufficient heat for heating the vehicle is provided.

The aim is solved by a thermal management arrangement and a method for operating such thermal management arrangement with the features as disclosed herein.

The aim of the invention is in particular solved by a thermal management arrangement for vehicles which substantially has a refrigerant circuit with at least the common components for the cold steam process such as a refrigerant compressor, a condenser/gas cooler, an expansion element and an evaporator, and in that furthermore a cold carrier circuit and a heat carrier circuit are present. The cold carrier circuit has a cold carrier distributor reservoir and the heat carrier circuit has a heat carrier distributor reservoir. The refrigerant circuit is thermally connected to the cold carrier circuit via the evaporator and the refrigerant circuit is thermally coupled to the heat carrier circuit via the condenser/gas cooler.

Furthermore, a battery heat exchanger supply section with a battery heat exchanger and an environmental heat exchanger supply section with an environmental heat exchanger are fluidly integrated into the cold and the heat carrier circuit. In doing so, the battery heat exchanger and the environmental heat exchanger are arranged and embodied such that they are respectively fluidly connected to the cold carrier distributor reservoir and to the heat carrier distributor reservoir. A fluid connection is understood to be one where corresponding conduits are provided through which gases or liquids flow correspondingly. The components of the heat carrier or cold carrier fluid are connected to one another via corresponding connections and valves such that they can be flowed through.

Preferably, the heat carrier distributor reservoir and the cold carrier distributor reservoir are fluidly connected to one another via a compensation circuit. The compensation circuit couples the heat carrier distributor reservoir and the cold carrier distributor reservoir such that, with an appropriate switch position, the heat carrier and the cold carrier distributor fluid are mixed together via the compensation circuit in the reservoirs.

For example, water glycol mixtures or other suitable media are used preferably as heat and as cold carriers.

A cold carrier in the sense of the invention is understood to be a fluid which, according to its arrangement and function, is used in the circuit for the transport of cold or for accepting heat, whereas a fluid which, according to its function and arrangement in the thermal management system, is used for the transport of heat, is referred to as a heat carrier.

According to an especially preferred, apparative embodiment of the invention, the heat carrier distributor reservoir and the cold carrier distributor reservoir are arranged in a container, wherein the two areas for the heat carrier and the cold carrier which are to be functionally and materially separated are separated from one another with a thermally insulating separating wall.

According to an alternative design of the invention, both reservoirs, the heat carrier distributor reservoir and the cold carrier distributor reservoir, are embodied as separated containers.

Preferably, a cold carrier/heat carrier pump for transporting the cold or heat carrier fluid is integrated into the heat carrier distributor reservoir and/or the cold carrier distributor reservoir. By integrating the pump into the component of the reservoir, a reduction of the components of the thermal management arrangement can be achieved.

Advantageously, a thermal heat exchanger for heating the passenger compartment is furthermore fluidly connected to the heat exchanger distributor reservoir and thus integrated into the thermal management arrangement.

Furthermore, advantageously at least one component heat exchanger is fluidly connected to the cold carrier distributor reservoir. A component heat exchanger is understood to be a heat exchanger for controlling the temperature of a component of the vehicle in the sense of the invention. The battery, electronic parts for operating the electric engines or these themselves, screens, power electronics, assistance systems for operating or driving the vehicle and the entertainment system are to be stated as components of the vehicle which are to be cooled and/or heated as well, for example.

Depending on the vehicle type and the size as well as on the functional extent, the heat carrier distributor reservoir and the cold carrier distributor reservoir possess a respective volume of 0.1 l to 5 l.

A very practical embodiment is that valves and/or sliders for regulating the heat and cold carrier volume flows and for shutting off the components are already respectively integrated into the component of the heat carrier distributor reservoir and/or the cold carrier distributor reservoir. This in turn advantageously leads to the reduction of the number of components for the thermal management arrangement.

A useful further development of the invention is that a reservoir heater is integrated into the heat carrier distributor reservoir and/or a reservoir cooler is integrated into the cold carrier distributor reservoir as an additional heater or cooler.

A particularly efficient and advantageous embodiment is that shut-off elements or switch elements are arranged in the battery heat exchanger supply section and in the environmental heat exchanger supply section such that the battery heat exchanger and the environmental heat exchanger are fluidly connected to the heat carrier distributor reservoir and the cold carrier distributor reservoir or shut off. Preferably, this is reached via 3/2 or 4/2 way valves as shut-off elements such that the battery heat exchanger and the environmental heat exchanger can be fluidly supplied both with heat carrier via the heat carrier distributor reservoir and/or with cold carrier via the cold carrier distributor reservoir.

The method for operating a thermal management arrangement in the refrigeration system mode is characterized in that the battery heat exchanger and the component heat exchangers are operated in the cold carrier circuit as a heat source for cooling and the environmental heat exchanger is operated as a heat sink in the heat carrier circuit.

The method for operating the thermal management arrangement in the heat pump mode without using an external heat source is characterized in that the component heat exchangers are operated in the cold carrier circuit and the battery heat exchanger and/or the thermal heat exchanger are operated in the heat carrier circuit.

The method for operating the thermal management arrangement in the heat pump mode with an external heat source is characterized in that the component heat exchangers and the environmental heat exchanger are operated in the cold carrier circuit and the battery heat exchanger and/or the thermal heat exchanger are operated in the heat carrier circuit.

The method for operating the thermal management arrangement in the reheat mode is characterized in that the component heat exchangers and the battery heat exchanger are operated in the cold carrier circuit, but the environmental heat exchanger and the thermal heat exchanger are operated in the heat carrier circuit.

Finally, the method for operating the thermal management arrangement in the compensation temperature mode is characterized in that the compensation circuit between the heat carrier distributor reservoir and the cold carrier distributor reservoir is operated such that heat carrier and cold carrier fluid are mixed and correspondingly, a mixing temperature for both circuits and reservoirs is set.

The advantages of the invention are diverse. In particular, it has to be outlined that through the efficient use of the internal and also of the external heat sources through the heat pump mode with an efficient and comfortable heating and cooling of the vehicle an acceptable increase in range through electric energy savings for battery-electric operated vehicles can be reached.

Furthermore, the refrigerant circuit is cheap and maintenance-friendly due to its simple construction. Apart from R1234yf, refrigerants such as R290, R1270, R744 or R134a as well as refrigerant mixtures can also be used as refrigerants. Especially in the point of view of low refrigerant filling volumes through the simple cooling system design, propane is also possible through the use of low quantities of refrigerant in the vehicle area. It is an advantage that the main technology is located in the coolant system and not in the refrigerant system, which makes the system less prone to failure and less maintenance-intensive. Depending on the requirement, components which improve the performance, such as internal heat exchanger, work-producing expansion, two-step compression with/without intercooling, medium pressure bottle and medium pressure injection can be used.

In summary, the conception of the invention is that a cold carrier and a heat carrier circuit are designed with a respective reservoir and are apparatively embodied in a simple manner. The environmental heat exchanger and the battery heat exchanger are respectively connected to both reservoirs. Both reservoirs can be embodied integrated in a component, wherein materially and thermally, a separating wall is provided. The separating wall can be thermally isolated by means of an air gap or insulation material.

For both distributor reservoirs, a thermal insulation from the environment is provided and pumps which are preferably integrated into the component provide for the transport and distribution of the cold and heat carrier.

Of particular note is that all the heat or exhaust heat from components of the vehicle can be used inside the vehicle for heating through the heat pump functionality. In special fields of application, additional heat or cold sources can be integrated into the system. The compensation circuit between the reservoirs enables a comfortable controlling and regulating strategy.

It is of advantage that only one heat exchanger, the environmental heat exchanger, is in interaction with the environment and accepts and gives off heat. This makes it possible to distribute corresponding heat flows in the system and to use them in a useful manner. Heat is released to or accepted from the environment only in case of an excess or a deficit.

DESCRIPTION OF AN EMBODIMENT

In FIGS. 1 to 6, a thermal management arrangement 1 is represented as a flow diagram according to an example embodiment of the invention. In the figures, the components of the thermal management arrangement 1 are identical; the operating modes are different. These are represented through corresponding labelling of the active circuits through marking of the fluid-conducting conduits.

Figure 1:
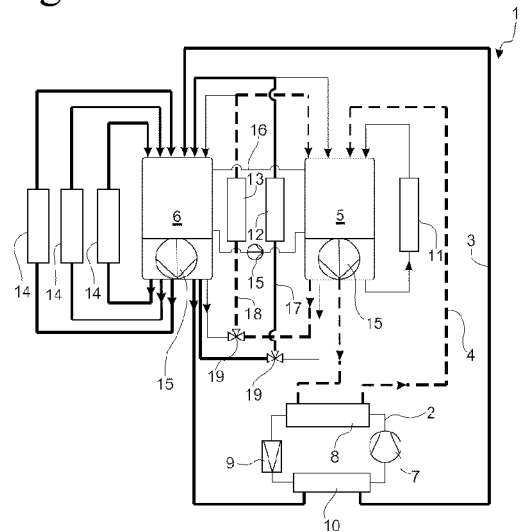
FIG. 1: Flow diagram of a thermal management arrangement in the refrigeration system mode.

FIG. 1 represents a thermal management arrangement 1 in the refrigeration system mode. In the following, the construction and the components of the thermal management arrangement 1 are described as an example of FIG. 1.

The thermal management arrangement 1 includes at least three base circuits. A base circuit forms a refrigerant circuit 2 which in turn has at least the components of refrigerant compressor 7, condenser/gas cooler 8, expansion element 9 and evaporator 10. This means that the refrigerant circuit with its base components is suited to carry out a cold steam process with the most different refrigerants. Of course it is possible, in principle, to expand the refrigerant circuit and adapt it to special requirements of different refrigerants, depending on the used refrigerants, but in order to minimize the refrigerant filling volume and with regard to costs, a refrigerant circuit with the base components according to the represented embodiment of the invention is realized.

As a second base circuit of the thermal management arrangement 1, a cold carrier circuit 3 is designed in which a cold carrier fluid circulates. Apart from the conduits connecting the components, the cold carrier circuit 3 has, in its base form, the evaporator 10 and the cold carrier distributor reservoir 6 on the cold carrier side. Furthermore, further component heat exchangers 14 are integrated into the cold carrier circuit 3 via the cold carrier distributor reservoir 6. The component heat exchangers 14 supply different components, depending on the design of the vehicle, such as the drive train or control and regulating components, with cold in order to guarantee a proper operation of the components and to prevent overheating.

The cold carrier distributor reservoir 6 possesses a cold carrier/heat carrier pump 15 which is integrated into the component and transports the cold carrier fluid to the component heat exchangers 14 and to the evaporator 10.

As a third base circuit of the thermal management arrangement 1, a heat carrier circuit 4 is embodied, which flows through the condenser/gas cooler 8 at the heat carrier side and accepts heat and which is connected to the heat carrier distributor reservoir 5. Furthermore, the thermal heat exchanger 11, which is designed for the heating of the vehicle compartment, is connected to the heat carrier distributor reservoir 5.

The thermal management arrangement 1 has the special feature that furthermore a battery heat exchanger 12 and an environmental heat exchanger 13 are integrated into the arrangement via a battery heat exchanger supply section 17 and via an environmental heat exchanger supply section 18. In doing so, both the battery heat exchanger 12 and the environmental heat exchanger 13 are fluidly connected both to the cold carrier circuit 3 and to the heat carrier circuit 4. The operating mode for the battery heat exchanger 12 and the environmental heat exchanger 13 is chosen via a switch position of the shut-off elements 19 which are preferably designed as 3/2 way valves. The shut-off elements 19 can also be designed as mixing valves, depending on the application situation, which makes it possible to set temperatures in the heat exchangers 12, 13 in a targeted manner. By integrating the battery heat exchanger 12 and the environmental heat exchanger 13 into the cold and heat carrier circuit 3, 4, these heat exchangers can, depending on the operating mode, be supplied with the corresponding cold carrier or heat carrier fluid either by the cold carrier circuit 3 or the heat carrier circuit 4 and thus cooled or heated depending on the application case.

Furthermore, a compensation circuit 16 is provided between the heat carrier distributor reservoir 5 and the cold carrier distributor reservoir 6. Cold carrier and heat carrier are materially and thus also thermally mixed via the compensation circuit 16 driven by a cold carrier/heat carrier pump 15.

FIG. 1 represents the refrigeration system mode of the thermal management arrangement 1 through a corresponding marking of the conduits which connect the components. The representations of FIG. 1 to FIG. 6 represent conduits through which a cold carrier fluid flows with a thick full line. A dotted line marks conduits through which a heat carrier fluid flows and a thin full line marks conduits which are not flowed through in the corresponding operating mode of the respective figure.

In the refrigeration system mode, the component heat exchanger 14 and the cold carrier circuit 3 are flowed through by cold carrier. Furthermore, the battery heat exchanger 12 is flowed through by the cold carrier and thus the battery is cooled in this mode. In the refrigeration system mode, the heat carrier circuit 4 and via the heat carrier distributor reservoir 5, the environmental heat exchanger 13 is integrated into the heat carrier circuit 4 in order to release exhaust heat of the cold production of the refrigerant circuit 2 and of the components to the environment via the environmental heat exchanger 13.

Figure 2:
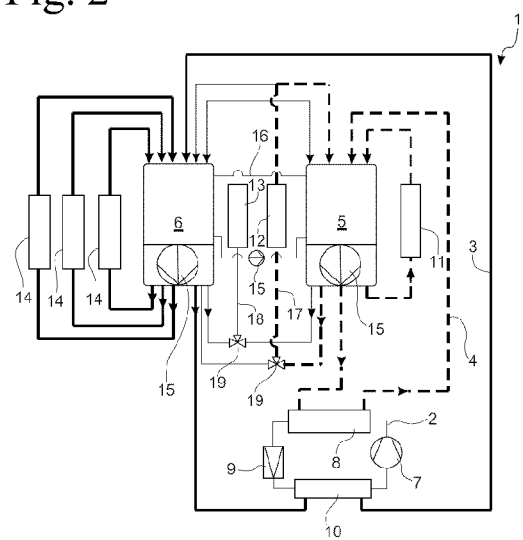
FIG. 2: Flow diagram of a thermal management arrangement in the heat pump mode without an external heat source.

FIG. 2 shows a heat pump mode without an external heat source. The components of the thermal management arrangement 1 correspond to the representation and description of FIG. 1. In the represented operating mode, the component heat exchangers 14 in the cold carrier circuit 3 are switched via the cold carrier distributor reservoir 6 and are cooled. The heat carrier circuit 4 uses the exhaust heat of the battery and via the battery heat exchanger 12 feeds it into the heat carrier distributor reservoir 5 and thus into the heat carrier circuit 4. In this operating mode, the thermal heat exchanger 11 is integrated into the heat carrier circuit 4 and supplies the passenger compartment with heat.

Figure 3:
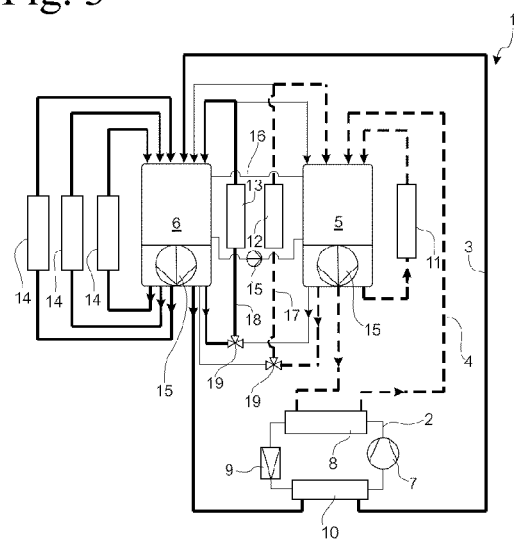
FIG. 3: Flow diagram of a thermal management arrangement in the heat pump mode with an external heat source.

FIG. 3 shows the heat pump mode with an external heat source. In doing so, as a difference to the mode according to FIG. 2, the environmental heat exchanger 13 is integrated into the cold carrier circuit 3 and the cold carrier distributor reservoir 6, through which environmental heat is accepted via the environmental heat exchanger 13 and transported into the cold carrier circuit 3 to the evaporator 10. Here, the heat is released to the refrigerant circuit 2. In the condenser/gas cooler 8, heat is released to the heat carrier circuit 4 via the cold carrier circuit 2 and transported to the thermal heat exchanger 11 for the release of heat.

Figure 4:
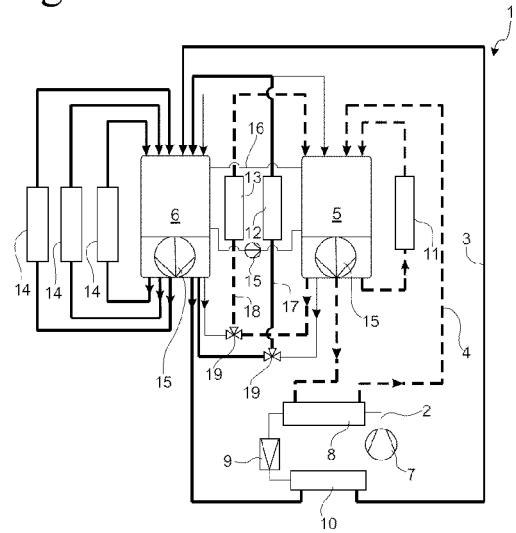
FIG. 4: Flow diagram of a thermal management arrangement in the reheat mode.

FIG. 4 shows the reheat mode of the thermal management arrangement 1. In doing so, the battery heat exchanger 12 is integrated into the cold carrier circuit 3 and the environmental heat exchanger 13 is integrated into the cold carrier circuit 4. The reheat mode is characterized in that, for the supply of the vehicle cabin with heated air, the latter is first cooled for dehumidification and subsequently reheated to the desired air outlet temperature for the vehicle cabin.

Figure 5:
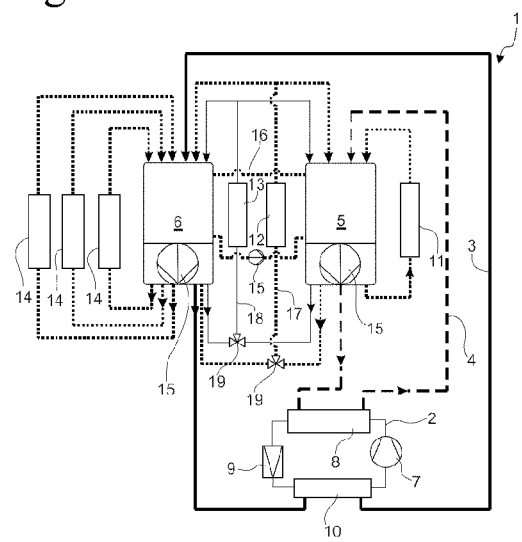
FIG. 5: Flow diagram of a thermal management arrangement in the compensation temperature mode.

FIG. 5 represents an operating mode with a mixed heat and cold carrier. This mode uses the fact that the refrigerant circuit 2 of the thermal management arrangement 1 simultaneously provides cold for the cold carrier circuit 3 and heat for the heat carrier circuit 4. Inside the vehicle itself, very different temperature levels are required. From the temperature levels of the cold and heat carrier, the desired temperature levels can be generated in a relatively simple and apparatively uncomplicated manner by mixing the cold and the heat carrier. In doing to, for example, the heating temperature level in the thermal heat exchanger 11 can be produced by mixture, such that in the air-conditioning system of the vehicle, the mixing valve can be omitted, for example, which makes it possible to reduce costs and save space. The conduits through which the mixed heat and cold carrier flows are represented as a dotted line. The base circuits, the cold carrier circuit 3 and the heat carrier circuit 4 are limited to the base circuits by flowing through the evaporators 10 and the condensers/gas coolers 8 and the respective heat carrier distributor reservoir 5 and cold carrier distributor reservoir 6. The two reservoirs, the heat carrier distributor reservoir 5 and the cold carrier distributor reservoir 6, are connected to one another via the compensation circuit 16. Thus, a material and thermal mixture of the heat carrier circuit 4 and the cold carrier circuit 3 in the two reservoirs 5, 6 is achieved, wherein a compensation temperature is set. The components of thermal heat exchanger 11, battery heat exchanger 12, environmental heat exchanger 13 as well as the component heat exchangers 14 are flowed through by the cold and heat carrier fluid with mixed temperature.

Figure 6:
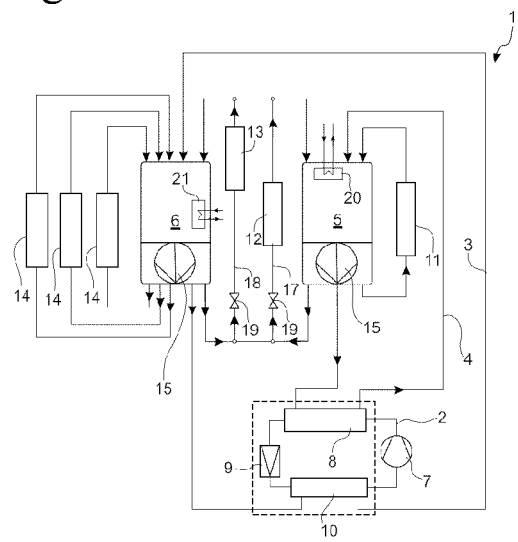
FIG. 6: Flow diagram of a thermal management arrangement with an additional heat and cold source.

FIG. 6 shows the thermal management arrangement 1 according to FIGS. 1 to 5 with two additional components. The heat carrier distributor reservoir 5 is equipped with an additional reservoir heater 20 via which additional heat can be introduced into the heat carrier distributor reservoir 5. Analogously, the cold carrier distributor reservoir 6 is equipped with a reservoir cooling 21 as an additional component in order to additionally cool the cold carrier if required.

An advantageous example embodiment of the invention which is not represented is that in the transition time at lower environmental temperatures without operating the refrigerant circuits, by only operating the cold carrier circuit with the inclusion of the environmental heat exchanger, the battery heat exchanger and the component heat exchangers can be used for cooling if the environmental air is cool enough in order to accept the heat from the environmental heat exchanger. An operating variant is that the cold carrier distributor reservoir is operated with the component heat exchangers and the environmental heat exchanger for cooling the components, whereas the battery heat exchanger is integrated into the heat carrier distributor reservoir and heats in a delayed manner through its own heating by means of the heat carrier circuit. In doing so, the cold carrier circuit and the heat carrier circuit can be coupled and thus the temperature levels can be set very accurately in a favorable regulation.

The invention relates to a thermal management arrangement and a method for operating a thermal management arrangement.

The invention claimed is:

1. A thermal management arrangement for a vehicle comprising:
   a refrigerant circuit further comprising:
     at least one refrigerant compressor;
     a condenser/gas cooler;
     an expansion element; and
     an evaporator,
   a cold carrier circuit with a cold carrier distributor reservoir; and
   a heat carrier circuit with a heat carrier distributor reservoir, wherein the refrigerant circuit is thermally connected to the cold carrier circuit via the evaporator and to the heat carrier circuit via the condenser/gas cooler, and wherein a battery heat exchanger supply section is arranged and embodied with a battery heat exchanger and an environmental heat exchanger supply section is arranged and embodied with an environmental heat exchanger such that they are respectively fluidly connected to the cold carrier distributor reservoir and to the heat carrier distributor reservoir.

2. The thermal management arrangement according to claim 1, wherein the heat carrier distributor reservoir and the cold carrier distributor reservoir are fluidly connected to one another via a compensation circuit.

3. The method for operating the thermal management arrangement according to claim 2, wherein in a compensation temperature mode, the compensation circuit is operated between the heat carrier distributor reservoir and the cold carrier distributor reservoir.

4. The thermal management arrangement according to claim 1, wherein the heat carrier distributor reservoir and the cold carrier distributor reservoir are embodied in a container with a thermally insulating separating wall.

5. The thermal management arrangement according to claim 1, wherein a cold carrier/heat carrier pump is integrated into the heat carrier distributor reservoir and/or into the cold carrier distributor reservoir.

6. The thermal management arrangement according to claim 1, wherein a thermal heat exchanger is fluidly connected to the heat carrier distributor reservoir.

7. The thermal management arrangement according to claim 6, wherein at least one component heat exchanger is fluidly connected to the cold carrier distributor reservoir.

8. A method for operating the thermal management arrangement according to claim 7, wherein in a refrigeration system mode, the battery heat exchanger and the at least one component heat exchanger are operated in the cold carrier circuit and the environmental heat exchanger is operated in the heat carrier circuit.

9. The method for operating the thermal management arrangement according to claim 8, wherein in a heat pump mode without an external heat source, the at least one component heat exchanger is operated in the cold carrier circuit and the battery heat exchanger and the thermal heat exchanger are operated in the heat carrier circuit.

10. The method for operating the thermal management arrangement according to claim 8, wherein in a heat pump mode with an external heat source, the at least one component heat exchanger and the environmental heat exchanger are operated in the cold carrier circuit and the battery heat exchanger and the thermal heat exchanger are operated in the heat carrier circuit.

11. The method for operating the thermal management arrangement according to claim 8, wherein in a reheat mode, the at least one component heat exchanger and the battery heat exchanger are operated in the cold carrier circuit and the environmental heat exchanger and the thermal heat exchanger are operated in the heat carrier circuit.

12. The thermal management arrangement according to claim 1, wherein the heat carrier distributor reservoir and the cold carrier distributor reservoir have a respective volume of 0.1 l to 5 l.

13. The thermal management arrangement according to claim 1, wherein valves and/or sliders are integrated into the heat carrier distributor reservoir and/or into the cold carrier distributor reservoir.

14. The thermal management arrangement according to claim 1, wherein a reservoir heater is integrated into the heat carrier distributor reservoir and/or a reservoir cooler is integrated into the cold carrier distributor reservoir.

15. The thermal management arrangement according to claim 1, wherein in the battery heat exchanger supply section and in the environmental heat exchanger supply section, shutoff elements are arranged such that the battery heat exchanger and the environmental heat exchanger are fluidly connected to the heat carrier distributor reservoir and/or the cold carrier distributor reservoir or are shut off.

* * * * *